(12) United States Patent
Kyowski et al.

(10) Patent No.: US 7,582,839 B2
(45) Date of Patent: Sep. 1, 2009

(54) BACKLIGHTED KEY FOR A KEYPAD OF AN ELECTRONIC DEVICE

(75) Inventors: Timothy Kyowski, Brantford (CA); Suzanne Man Pang, Kowloon (CN); Albert Ng, Vancouver (CA)

(73) Assignee: Research in Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/679,981

(22) Filed: Feb. 28, 2007

(65) Prior Publication Data

US 2008/0202907 A1    Aug. 28, 2008

(51) Int. Cl.
*H01H 9/00* (2006.01)
*H01H 1/52* (2006.01)
*H01H 3/20* (2006.01)

(52) U.S. Cl. ..................... 200/310; 200/314
(58) Field of Classification Search .......... 200/310–317
See application file for complete search history.

(56) References Cited

U.S. PATENT DOCUMENTS 4,873,402 A * 10/1989 Honda et al. ............... 200/283
5,280,145 A    1/1994 Mosier et al.
5,892,192 A * 4/1999 Ishiguro et al. ............. 200/5 R
6,498,311 B1  12/2002 Stewart et al.
6,576,856 B2 * 6/2003 Masaru et al. .............. 200/512
6,936,783 B2 * 8/2005 Kawaguchi et al. ......... 200/514
2003/0006128 A1 * 1/2003 Giles et al. ................. 200/314

FOREIGN PATENT DOCUMENTS

DE    19758496    3/1999
EP    0622585     11/1994

* cited by examiner

*Primary Examiner*—Elvin G Enad
*Assistant Examiner*—Lheiren Mae A Anglo
(74) *Attorney, Agent, or Firm*—McCarthy Tétrault LLP

(57) ABSTRACT

The invention relates to a key plunger for a key of an electronic device. The plunger comprises: a stalk made of a transparent material allowing light to pass through; a plinth connected to the top of the stalk; and a body section connected to the top of the plinth made of a translucent, light-diffusing material. The body section is shaped to fit snugly within an interior of a cap for the key. The plunger is made from a two-shot moulding process for forming the stalk and the section. The plunger may be part of a key assembly that also has a key cap shaped to snugly fit over the plunger and a backlight to light an interior of the cap.

21 Claims, 5 Drawing Sheets

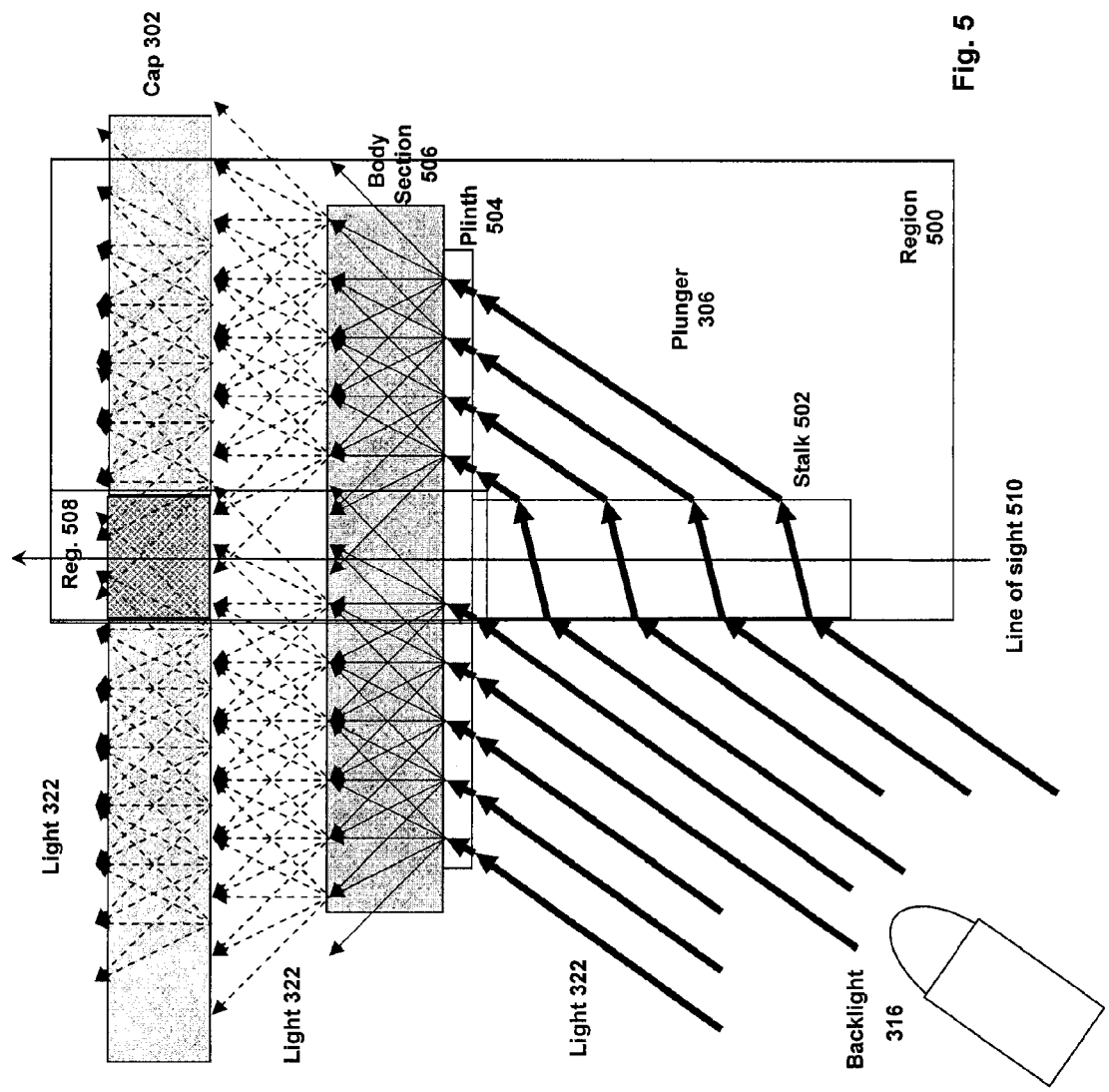

BACKLIGHTED KEY FOR A KEYPAD OF AN ELECTRONIC DEVICE

FIELD OF THE INVENTION

The invention described herein relates to a backlighted key providing an input device in an electronic device, such as a handheld electronic communication device. In particular, the invention relates to a system and method for providing a backlight to a key in a keypad in the device through an internal light shining through the interior of the key.

BACKGROUND OF THE INVENTION

A conventional handheld electronic device, such as a Personal Digital Assistant (PDA) and a wireless telephone, includes a keyboard/keypad, a display and a system printed circuit board (PCB) disposed within a common housing.

As is typical in a keypad, some of its keys may be backlighted, such that light is provided from the interior of the key and is emitted out of the top and/or sides of the key. The backlighting system may be selectively activated. However, internal components in such keys, notably their stalks of their plungers, may impede dispersion of the light within the keys, thereby providing dark spots where light leaves the top of the keys.

There is a need for an alternative backlight system for a key which provides an improvement over the prior art.

BRIEF DESCRIPTION OF THE DRAWINGS

The invention will now be described, by way of example only, with reference to the accompanying drawings, in which:

FIG. 5 is a side view of elements of the keypad assembly of FIG. 3.

DETAILED DESCRIPTION OF EMBODIMENTS

Figure 1:
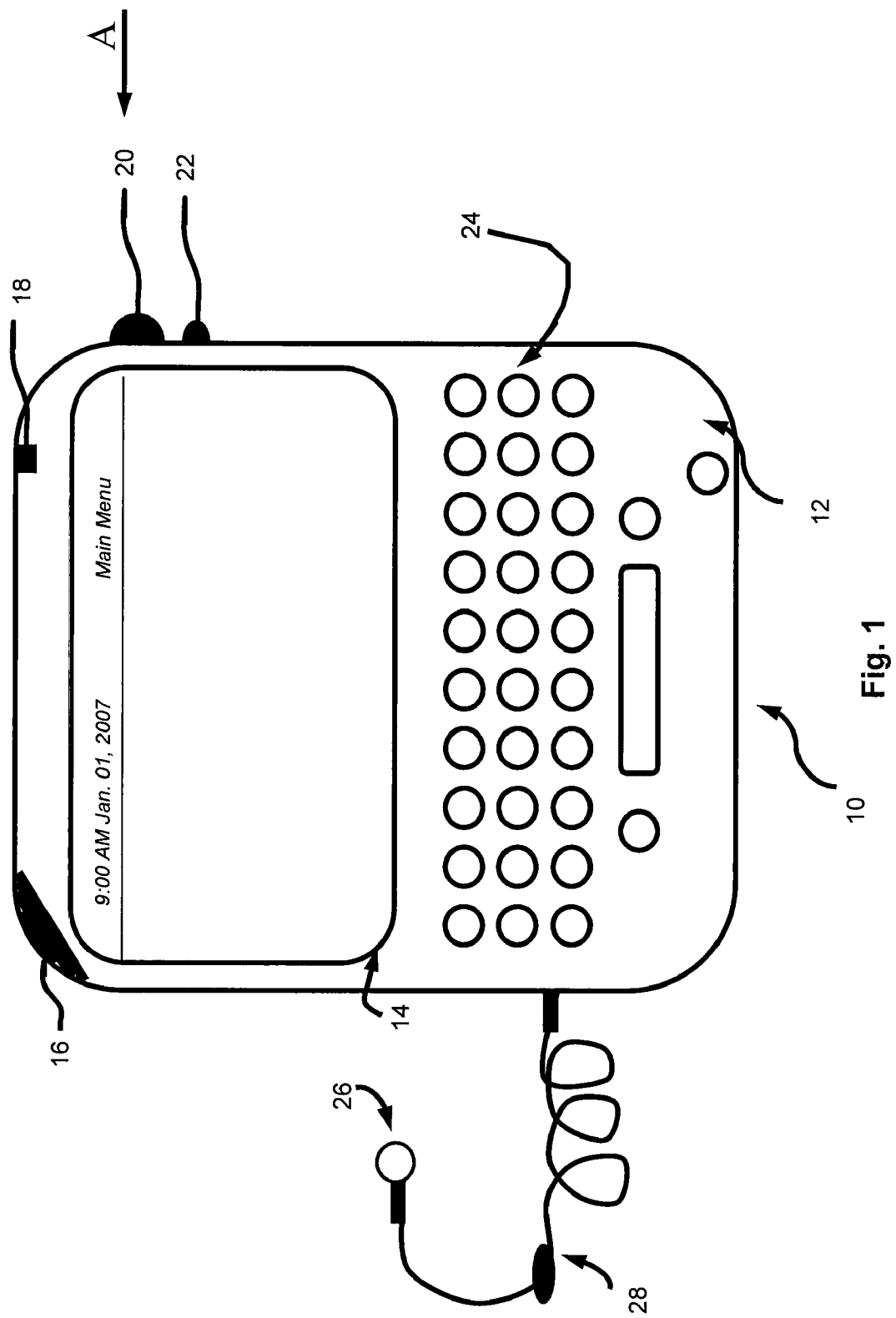
FIG. 1 is a top plan view of a handheld electronic device with a keypad that implements an embodiment of the invention described herein.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In a first aspect, a key plunger for a key of an electronic device is provided. The plunger comprises: a stalk made of a transparent material allowing light to pass through; a plinth connected to the top of the stalk; and a body section connected to the top of the plinth made of a translucent, light-diffusing material. The body section is shaped to fit snugly within an interior of a cap for the key. The plunger is made from a two-shot moulding process for forming the stalk and the body section.

In the plunger, the plinth may be made of the transparent material and may be formed with the stalk in the moulding process. Alternatively, the plinth may be made of the light-diffusing material and may be formed with the body section.

In a second aspect, a key assembly for a key in a keypad of an electronic device is provided. The assembly comprises: a key plunger; a key cap shaped to fit over the plunger; and a backlight to a backlight to illuminate an interior of the key cap. The key plunger has: a stalk made of a transparent material allowing light to pass through; a plinth connected to the top of the stalk; and a body section connected to the top of the plinth. The body section is made of a translucent, light-diffusing material and is shaped to fit snugly within an interior of a cap for the key. The key plunger is made from a two-shot moulding process for forming the stalk and the body section.

In the assembly, the plinth of the plunger may be made of the transparent material and may be formed with the stalk in the moulding process. Alternatively, the plinth may be made of the light-diffusing material and may be formed with the body section.

For the keypad, other keys in the keypad may not incorporate the key plunger.

In the assembly, a first layer of paint may provide an outline of a character associated with the key and may be applied to the top of the key cap. Further, the character may be etched in the first layer of paint. Further still, a second layer of transparent paint may be provided between the cap and the first layer of paint.

In a third aspect, a key assembly for a key of an electronic device is provided. The assembly comprises: a key plunger; a key cap shaped to fit over the plunger; and a backlight to a backlight to illuminate an interior of the key cap. The key plunger has: a stalk made of a transparent material allowing light to pass through; and a body section connected to the top of the stalk. The body section is made of a translucent, light-diffusing material and is shaped to fit snugly within an interior of a cap for the key. The key plunger is made from a two-shot moulding process for forming the stalk and the body section.

In other aspects various combinations of sets and subsets of the above aspects are provided. Exemplary details of embodiments are provided herein. First, a description is provided on general concepts and features of a communication device and then further detail is provided on a key assembly and the components provided therein allowing backlighting of the key.

FIG. 1 provides a snapshot of typical elements associated with an embodiment. Therein, general features of a portable, electronic device are shown generally at 10. Device 10 is based on a computing platform having functionality of an enhanced personal digital assistant with a cellphone and can receive and transmit wireless communications, including as email, SMS and voice communications. Electronic device 10 can be based on construction design and functionality of other electronic devices, such as smart telephones, desktop computers, pagers or laptops having telephony equipment. In an embodiment, electronic device 10 includes a housing 12, an LCD 14, speaker 16, an LED indicator 18, a trackball 20, an ESC ("escape") key 22, keypad 24, a wired telephone headset 30 comprised of an ear bud 26 and a microphone 28. Trackball 20 and ESC key 22 can be inwardly depressed along the path of arrow "A" as a means to provide additional input to device 10. It will be understood that housing 12 can be made from any suitable material as will occur to those of skill in the art and may be suitably formed to house and hold all components of device 10. Further detail on components of device 10 are provided below.

Device 10 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 26 can be used to listen to phone calls and other sound messages and microphone 28 can be used to speak into and input sound messages to device 10. Device 10 may communicate with additional remote devices or accessories, such as wireless headset (not shown).

Figure 2:
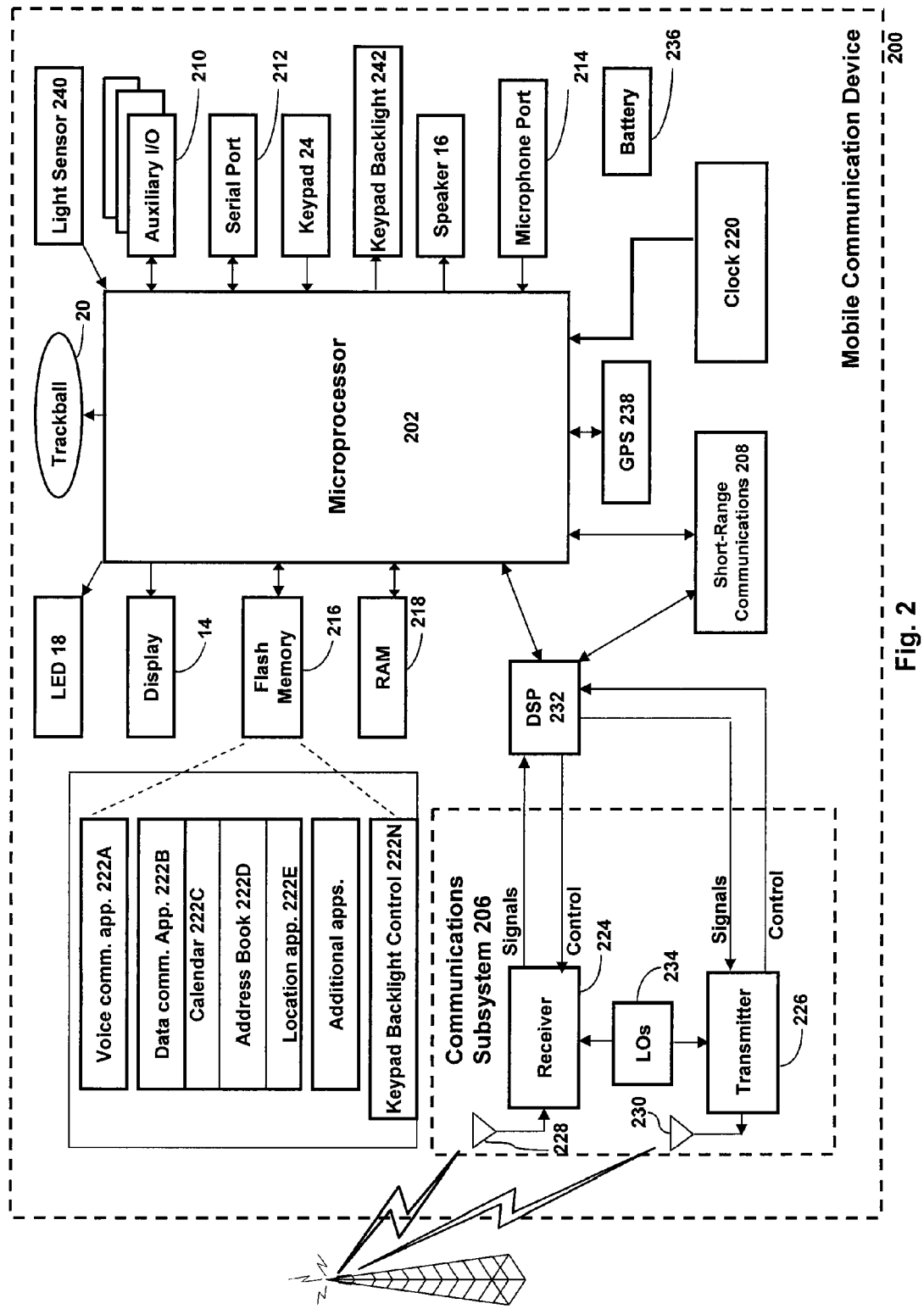
FIG. 2 is a schematic view depicting functional details of the handheld electronic device of FIG. 1, including the keypad and a backlight system for the keypad according to an embodiment.

Referring to FIG. 2, functional components of device 10 are provided in schematic 200. The functional components are generally electronic, structural or electromechanical devices. In particular, microprocessor 202 is provided to control and receive almost all data, transmissions, inputs and outputs related to device 10. Microprocessor 202 is shown schematically as coupled to keypad 24 and other internal devices. Microprocessor 202 preferably controls the overall operation of the device 10 and its components. Exemplary microprocessors for microprocessor 202 include Data 950 (trade-mark) series microprocessors, the 6200 series microprocessors and the PXA900 series baseband processors, all available at one time from Intel Corporation. Microprocessor 202 is connected to other elements in device 10 through a series of electrical connections to its various input and output pins. Microprocessor 202 has an IRQ input line which allows it to receive signals from various devices. Appropriate interrupt firmware is provided which receives and reacts to the signals detected on the IRQ line.

In addition to the microprocessor 202, other internal devices of the device 10 are shown schematically in FIG. 2. These include: display 14; speaker 16; keypad 24; backlight system 242 for keypad 24; communication sub-system 206; short-range communication sub-system 208; auxiliary I/O devices 210; (serial) port 212; microphone port 214 for microphone 28; flash memory 216 (which provides persistent storage of data); random access memory (RAM) 218; clock 220 and other device sub-systems (not shown). Device 10 is preferably a two-way radio frequency (RF) communication device having voice and data communication capabilities. In addition, device 10 preferably has the capability to communicate with other computer systems via the Internet.

Operating system software executed by the microprocessor 202 is preferably stored in a computer-readable medium, such as flash memory 216, but may be stored in other types of memory devices, such as read-only memory (ROM) or similar storage element. In addition, system software, specific device applications, or parts thereof, may be temporarily loaded into a volatile store, such as RAM 218. Communication signals received by the mobile device may also be stored to RAM 218.

Microprocessor 202, in addition to its operating system functions, enables execution of software applications on device 10. A set of software (or firmware) applications, generally identified as applications 222, that control basic device operations, such as voice communication application 222A and data communication application 222B, may be installed on the device 10 during manufacture or downloaded thereafter. As well, software applications, such as calendar application 222C, address book 222D and location application 222E.

Backlight interface application 222N can selectively activate and deactivate backlight system 242 for keypad 24. Additional applications such as personal information manager (PIM) application may be provided. Any application may be installed during manufacture or downloaded thereafter into device 10. Data associated with each application can be stored in flash memory 216.

Communication functions, including data and voice communications, are performed through the communication sub-system 206 and the short-range communication sub-system 208. Collectively, sub-systems 206 and 208 provide the signal-level interface for all communication technologies processed by device 10. Various applications 222 provide the operational controls to further process and log the communications. Communication sub-system 206 includes receiver 224, transmitter 226 and one or more antennas, illustrated as receive antenna 228 and transmit antenna 230. In addition, communication sub-system 206 also includes processing modules, such as local oscillators (LOs) 234. The specific design and implementation of communication sub-system 206 is dependent upon the communication network in which device 10 is intended to operate. For example, communication sub-system 206 of device 10 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 10. In any event, communication sub-system 206 provides device 10 with the capability of communicating with other devices using various communication technologies, including instant messaging (IM) systems, text messaging (TM) systems and short message service (SMS) systems.

Digital signed processor (DSP) 232 may be provided to assist in processing raw digital signals and commands from microprocessor 202 to sub-system 206. In addition to processing communication signals, DSP 232 provides control of receiver 224 and transmitter 226. For example, gains applied to communication signals in receiver 224 and transmitter 226 may be adaptively controlled through automatic gain-control algorithms implemented in DSP 232.

In a data communication mode, a received signal, such as a text message, Web page download or command from headset 40, is processed by the communication sub-system 206 and is provided as an input to microprocessor 202. The received signal is then further processed by microprocessor 202 which can then generate an output to display 14 or to an auxiliary I/O device 210. A device user may also compose data items, such as e-mail messages, using keypad 24, trackball 20 and/or some other auxiliary I/O device 210, such as a touchpad, a rocker switch, a trackball or some other input device. The composed data items may then be transmitted over communication network 140 via communication sub-system 206. Sub-system 206 may also detect when it is out of communication range for its remote systems.

In a voice communication mode, overall operation of device 10 is substantially similar to the data communication mode, except that received signals are output to speaker 16, and signals for transmission are generated by microphone 28. Alternative voice or audio I/O sub-systems, such as a voice message recording sub-system, may also be implemented on device 10. In addition, display 14 may also be utilized in voice communication mode, for example, to display the identity of a calling party, the duration of a voice call, or other voice call-related information.

Short-range communication sub-system 208 enables communication between device 10 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices. Short range communication system 208 may be used as the signal communication interface for device 10 and other devices. DSP 232 may process some of the commands and signals destined for the other devices.

Powering the entire electronics of the mobile handheld communication device is power source 236. In one embodiment, power source 236 includes one or more batteries. In another embodiment, power source 236 is a single battery pack, especially a rechargeable battery pack. A power switch (not shown) provides an "on/off" switch for device 10. A power source interface (not shown) may be provided in hardware, firmware, software or a combination of such elements to selectively control access of components in device 10 to power source 236. Upon activation of the power switch an application 222 is initiated to turn on device 10. Upon deactivation of the power switch, an application 222 is initiated to turn off device 10. Power to device 10 may also be controlled by other devices and by software applications 222.

Device 10 may also have global positioning system 238 to assist in identifying a present location of device 10 and may also have light sensor 240 to provide data on the ambient light conditions for device 10. If the detected ambient light levels are sufficiently low, backlight system 242 may be activated. These elements may be controlled by software operating on device 10 as described earlier.

Now, further details are provided on embodiments relating to key assembly backlighting systems. In particular, the embodiments provide improved dispersion of light by changing aspects of the key plunger in a key system.

Figure 3:
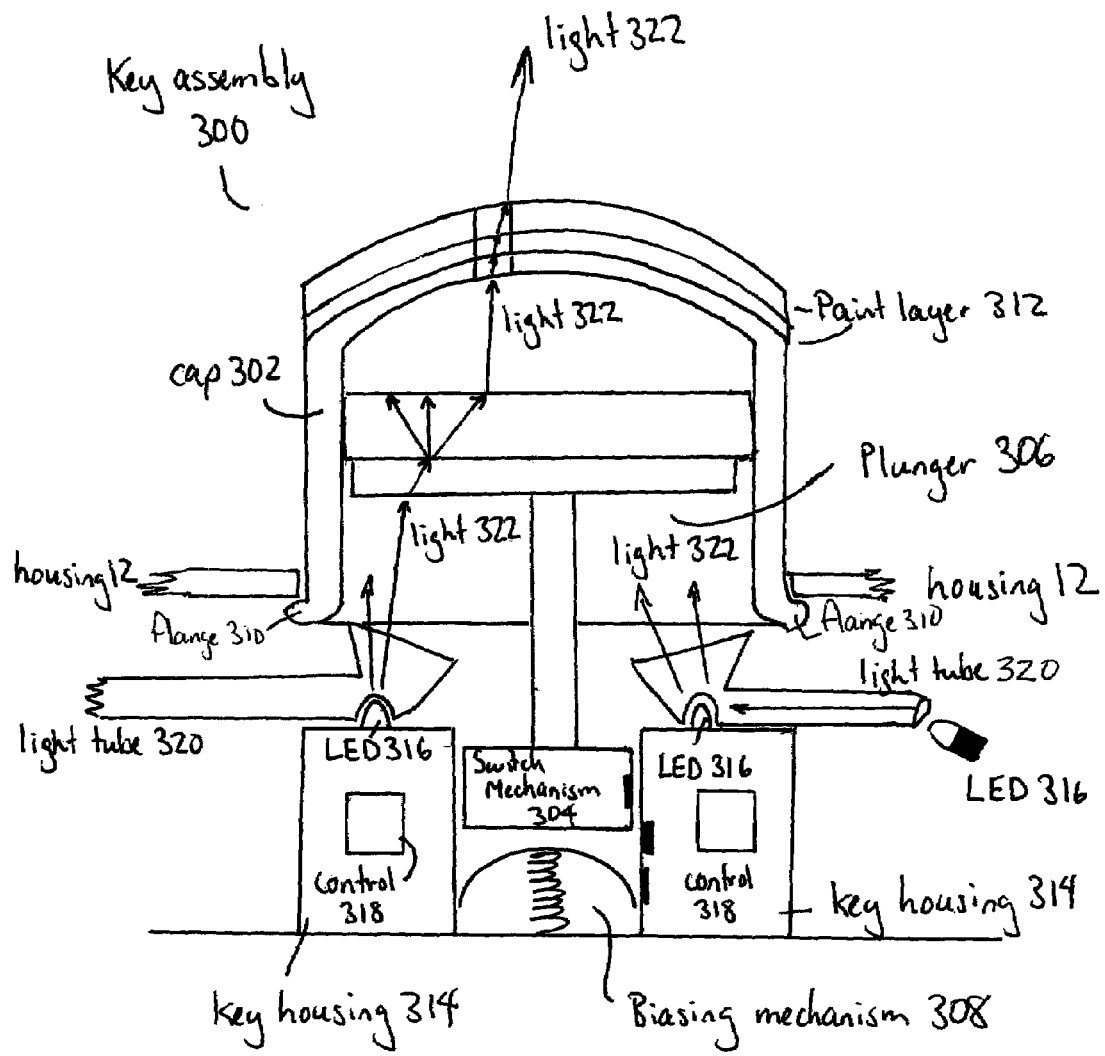
FIG. 3 is a side cross-sectional view of an embodiment of a keypad assembly of the keypad of the device of FIG. 1.
Figure 4:
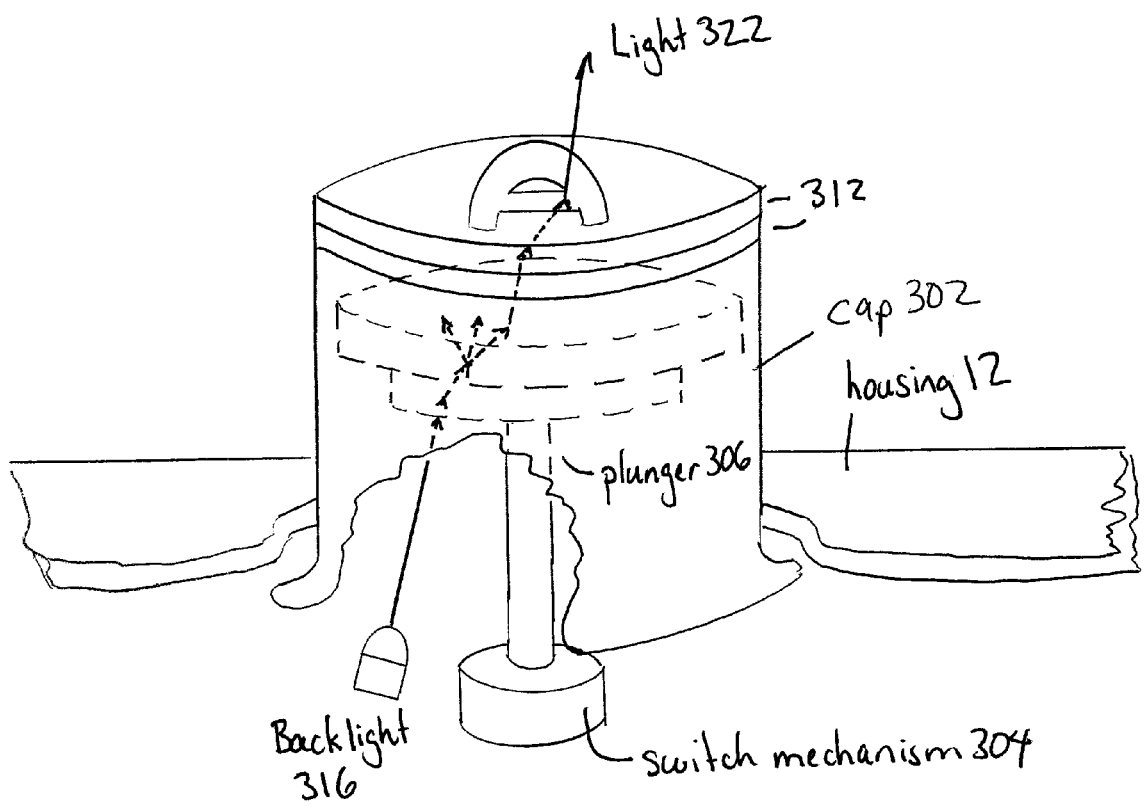
FIG. 4 is a top perspective exploded, cut-out view of the keypad assembly of FIG. 3.

Referring to FIGS. 3 and 4, in an embodiment, key 24 in keypad 24 (FIG. 1) is shown through key assembly 300. Key assembly 300 includes the following elements: key cap 302, switch mechanism 304, key plunger 306, biasing mechanism 308. Key cap 302 is generally the shape of an hollow upright cylinder having an open end on its bottom and a raised convex-shaped dome its top. It can be of any size suitable for a keyboard of an electronic device: it can be about the size and shape of a typical key on a regular, full-size keyboard; it can be larger than such a key; it can be the size and shape of a key that is provided on a PDA. It will be appreciated that almost any size, shape and dimensions can be provided for such a key. The interior cavity of the key may be of any suitable shape as well. One feature of the key is that it allows light to be transmitted from its interior to the exterior of cap 302, typically through the top of cap 302. As such, the dimensions and composition of parts of cap 302 may be suitably provided to allow this feature.

Key 24 is embossed with a symbol on its top to identify its function. As shown in FIG. 4, the value assigned to the key is the character "A". Paint layers 312 are applied to the top of cap 302 and different regions in each layer 312 provide specific transparent or translucent regions and other regions of opaque regions. The paint layers may be a coloured paint, lacquer or other suitable coating. The top of key 24 may also have specific transparent or translucent regions and other regions of opaque regions. The symbol may be presented in outline, shadow, block or other formats. Lower layer 312 may be a "black" transparent paint; upper layer may be a non-transmissive silver paint.

One effect of having specific transparent or translucent regions and other regions of opaque regions for the character for key 24 facilitates backlighting for key 24 through backlight system 242. Generally, backlight system 242 includes a light source, such as backlight 316 that emits a light from the interior of key 24 upward through the transparent or translucent regions in the top of cap 302 and paint layers 312. The net effect of the transparent and opaque regions in key 24 and layers 312 illuminates aspects of the symbol, when backlighted. Depending on the visual design for the backlighting, one or more of the following parts of the character may be illuminated: its interior; its exterior; its outline; and a shadow region. For example, for the letter "A" as shown in FIG. 4, one embodiment has the interior sections of the character provided in transparent or translucent paint. As such if key 302 was an "A" key then the light 322 would shine through either the body of the "A" when backlight 316 is activated and not through the background of the "A" (or at least not as much). Where paint layer 312 is non-transmissive, areas where light is to intended to be transmitted through may have paint etched out using techniques known in the art, including lasers. In some embodiments, the upper paint layer 312 may be the only paint layer applied to the top of key 302.

It will be appreciated that the terms transparent, translucent and opaque have some degree of variations allowed to those of skill in the relevant art of materials composition. As such, for example, a material which is transparent may have some colourations therein; and an opaque material may allow some light to transmit therethrough.

Further detail is provided on interior features of key 24. Key cap 302 is positioned within an opening in housing 12, with a lower portion extending into housing 12 through the opening. Key cap 302 may have an exterior flange 310 extending outwardly from its bottom edge to retain the lower portion of cap 302 within housing 12. Key plunger 306 is dimensioned to fit snugly within key cap 302. As such, key plunger 306 has a generally cylindrical body with a generally flat top. Key cap 306 is made of a thin and relatively flexible material such as a relatively thin plastic or metal. As noted above, paint layers 312 are applied on top of key cap 306 to identify the key.

Switch mechanism 304 has an activation sensor local to each key 24 which provides an indication of an activation state of the key assembly. The activation state can include at least an actuated state and a non-actuated state.

Structurally, switch mechanism 304 is a cylindrical barrel having switch contacts thereon; it is attached to the bottom surface of key plunger 306 and cooperates with key housing 314. Contacts on side of key housing 314 make electrical contact with a contact on switch mechanism 304 which key 24 is in a first position and second position. Biasing mechanism 308 is located between the bottom of switch mechanism 304 and the PCB of device 10. Biasing mechanism 308 provides a compressible element which biases switch mechanism 304 (and as such key cap 302) upward. As key assembly 300 is depressed, biasing mechanism 308 imparts an incrementally increasing upward force to resist the downward force being imparted. Upon release of the key assembly 300, biasing mechanism 308 forces the key cap 302 upward to its resting position. Although biasing mechanism 308 is shown as a coiled spring with a concave dome, in other embodiments it may be implemented as a leaf spring, a resilient puck (e.g. made from rubber or foam) or any other compressible, resilient mechanical arrangement which imparts an upward bias onto switch mechanism 304 (or any other engageable part of key assembly 300). Key housing 314 provides structural support to elements relating to key assembly 300, without unduly restricting movement of its elements described herein.

In key housing 314, one or more components of backlight system 242 (FIG. 2) are provided. Backlight system 242 comprises one or more of backlights 316, control module 318 and light tubes 320. Backlights 316 may be any illuminating device, such as an LED, filament, bulb, phosphor, gas, or any controllable light emitting source. Each backlight 316 may be of a different or same colour; each backlight per key may be the same or different colours. In an embodiment, one or more backlights 316 may be used to illuminate a set of keys 24. Control module 318 in one embodiment is an electrical circuit that selectively connects backlights 316 to an appropriate power signal. As such, control module 318 may selectively turn on, turn off and adjust the illuminated intensity of backlights 316. Control module 318 may have a controlling signal provided from backlight control application 222N (FIG. 2). Light tubes 320 are physical conduits that have one or more light input points (to receive backlights 316) from and one or more light output points (to illuminate an interior of key 24) and internal conduits transmit the light between the points.

For the sake of illustration, FIG. 4 shows only one backlight 316 for key 24. However, it will be appreciated that two or more backlights 316 may be provided for key 24 where the backlights 316 are located around key 24.

Generally, light 322 from backlight 316 is directed upward into the interior body of key cap 302. Light 322 passes through plunger 306 and through the top of cap 302 (where it is not painted). Key cap 302 may be manufactured from any suitable material. Generally, it is coated with or is painted with an opaque region and selective transparent or translucent regions 326 to allow light 322 to be emitted from the interior of cap 302.

It will be appreciated that in key assembly 300, backlights 316 provide one or more point sources of interior light. Structures within key assembly 300, such as plunger 306, may interfere with the straight, upward transmission of light through the top of cap 302. As such, for any particular backlight 316, plunger 306 will cause the casting of a "shadow" region behind it (relative to the location of backlight 316). This can lessen the amount of light that is emitted out of the part of the top of cap 302 that is directly above the "shadow" region; see for example region 500.

It will be appreciated that in other embodiments, the dimensions and shapes of the elements of another key assembly may be modified to meet any design, functional, aesthetic or structural requirements.

Referring to FIG. 5 further detail is provided on plunger 306 according to an embodiment. To lessen the amount of shadow in the "shadow" region, plunger 306 is provided with special characteristics and compositions. Plunger 306 is comprised of three main, connected parts. At its bottom, plunger 306 has a generally vertical stalk 502 that is in contact at its bottom end with switch mechanism 304 (FIG. 3). For one embodiment, FIG. 5 shows plunger 306 as being a solid component. At the top of stalk 502, a generally horizontal plinth 504 is attached thereto. For the arrangement of the interior of key assembly 300, the center of plinth 504 is attached to the top of stalk 502. Plinth 504 has a shape that horizontally spans much of, but not necessarily all of, the interior width of cap 302. It can be generally disc-shaped. On top of plinth 504, body section 506 is attached. Body section 506 is also generally a horizontally extending form and fits snugly within cap 302. The shape and dimensions of body section 506 are provided that the top of body section 506 may be shaped to fit snugly against the interior surface of cap 302 and/or the exterior edges of body section 506 have a snug friction fit with the interior sides of key 302. For one embodiment, FIG. 5 shows body section 506 as being a solid component. In the interior of key 302, there may be one or more inwardly protruding features therein against which a corresponding feature of body section 506 (or plinth 504 or stalk 502) may cooperate in order to provide a snug fit of plunger 306 within cap 302. In FIG. 3, there is an air gap between the top of body section 506 (not labelled) and the top of the interior of cap 302. This gap may or may not be provided in other designs of cap 302 and plunger 306. In other embodiments, plinth 504 may be removed and body section 506 may attach directly to stalk 502. In other embodiments, plinth 504 may be formed as a part of body section 504.

As noted, plunger 306 is shaped to fit within cap 302 and to provide a physical interface to transmit movement (downward or upward) of key 24 to the contacts in key housing 314. As such the components, structure, and dimensions of plunger 302 may be suitably customized to work with the shape of cap 302 (and its interior cavity), switch mechanism 304 and contacts for the key in key housing 324. In some embodiments, plunger 306 may be comprised of a stalk 502 with a shaped upper end that snugly fits within cap 302. The upper end of such a stalk may have a different composition than the shaft of the stalk, per embodiments described below. Similarly, the shapes and dimensions, and even presence, of plinth 504 and top body section 506 may be customized accordingly.

In one embodiment, plunger 302 is made of different materials. Generally, the materials are either translucent or transparent, allowing at least some light to pass through, thereby helping to minimize the darkness of at least two "shadow" regions as described below.

First, in order to assist with reducing the darkness of "shadow" region 500 of the shadow cast by stalk 502 below plinth 504, the materials of stalk 502 are selected to allow more light through. As such, in one embodiment, stalk 502 is made of a clear, if not effectively transparent material, such as a clear polycarbonate or resin.

Second, in order to assist with reducing the "shadow" region 500 above body section 506, the materials of body section 506 are selected to selectively disperse more light through body section 506. As such, in one embodiment, body section 506 is made of a light-diffusing material, such as a smoky-coloured polycarbonate or resin. The smoky colour for body section 506 may be chosen to tailor the colour of the backlighting. As shown in FIG. 5, the light 322 that is transmitted through body section 506 is being diffused therethrough. As such, some of the light 322 that enters from the non-shadowed region below plunger 306 is diffused towards the shadow region 508 as it is emitted out of the top of body section 506 into region 508.

Plinth 504 is provided as a clear material, which may be the same material as stalk 502. In this configuration, plinth 504 does not disperse much light 322 that transmits through it. In other embodiments, plinth 504 may be composed of the same material as body section 506 or may be composed of a material that is either more or less light-diffusing that the material of body section 506. It will be appreciated that any suitable transparent or translucent material may be used for the composition of the components of plunger 306.

One light transmission feature of plunger 306 is that light 322 that is emitted through cap 302 in the region immediately over stalk 502 (see region 508 and line of sight arrow 510), the darkness of this region is reduced by the embodiment. This is due in part to the diffusion of light into the corresponding region of body section 506 and in part to the transparent material provided for stalk 504.

It can be seen that the overall effect of the embodiment is that light 322 that is being transmitted out of cap 302 has the depths of shadow regions 500 and 508 reduced through the composition of plunger 306.

Plunger 306 may be manufactured in a "two-shot" moulding process using appropriate materials, such as clear and coloured resins and using techniques known in the art. Alternatively, components of plunger 306 may be separately formed then joined together via a gluing or welding process, using techniques known in the art. Further if additional physical features are required for plunger 306, such features may be added through another moulding process (i.e. a third shot).

In one embodiment, the keys of keypad 24 may be provided as a mix of plungers 302, where some plungers are the above-noted two-shot moulded plungers and others are made from a single shot process. For example, keys associated with characters that have backlight sections at are immediately above their respective internal stalks, may use the plungers described herein. In one embodiment, such plungers are used for a "RETURN" key and a "FUNCTION" key on a portable communication device, while all other keys use a different composition of plungers.

The present invention is defined by the claims appended hereto, with the foregoing description being merely illustrative of a preferred embodiment of the invention. Those of ordinary skill may envisage certain modifications to the foregoing embodiments which, although not explicitly discussed herein, do not depart from the scope of the invention, as defined by the appended claims.

We claim:

1. A key plunger for a key of an electronic device, comprising:
   a stalk made of a first material allowing light to pass through;
   a plinth connected to the top of said stalk; and
   a body section connected to the top of said plinth, said body section made of a second, material and shaped to fit snugly within an interior of a cap for said key and to extend horizontally about said stalk,
   wherein
   said second material is a translucent, light-diffusing material;
   said first material allows more light to pass therethrough than said second material;
   either a two-shot moulding process or a welding process is used to form said key plunger;
   in said key plunger, said second material disperses light from a source located below said body section which enters said body section into a region in said body section immediately over said stalk to brighten a first shadow region associated with said region in said body section; and
   said transparent material transmits light passing through said stalk from said source to brighten a second shadow region located on a side of said stalk which is opposite to said source.

2. The key plunger as claimed in claim 1, wherein said transparent material comprises a clear polycarbonate or resin.

3. The key plunger as claimed in claim 2, wherein:
   said plinth
   is made of said first material; and
   is formed with said stalk when said two-shot moulding process is used; and
   said stalk is solid.

4. The key plunger as claimed in claim 2, wherein:
   said plinth
   is made of said second material; and
   is formed with said body section when said two-shot moulding process is used; and
   said stalk is solid.

5. The key plunger as claimed in claim 2, wherein said second material in said body section comprises a coloured polycarbonate or resin and disperses light within said body about said region to further reduce said shadow in said shadow area.

6. A key assembly for a key of a keypad of an electronic device, comprising:
   a key plunger having
   a stalk made of a first material allowing light to pass through;
   a plinth connected to the top of said stalk; and
   a body section connected to the top of said plinth, said body section made of a second material and shaped to fit snugly within an interior of a cap for said key and to extend horizontally about said stalk;
   a key cap shaped to fit over said key plunger; and
   a backlight to illuminate an interior of said key cap, said backlight located underneath said key plunger and to a side of said stalk,
   wherein
   said second material is translucent and light-diffusing;
   said first material allows more light to pass therethrough than said second material;
   either a two-shot moulding process or a welding process is used to form said key plunger; and
   in said key plunger, said second material allows light transmitted from said backlight which enters said body section from underneath said body section and from said side of said stalk to be dispersed into a region in said body section immediately over said stalk to brighten a first shadow region associated with said region in said body section and said first material allows transmission of light passing through said stalk from said backlight to brighten a second shadow region located on a second side opposite of said side of said stalk.

7. The key assembly for a key of a keypad of an electronic device as claimed in claim 6, wherein said first material comprises a clear polycarbonate or resin.

8. The key assembly for a key as claimed in claim 7, wherein:
   said plinth
   is made of said first material; and
   is formed with said stalk when said two-shot moulding process is used; and
   said stalk is solid.

9. The key assembly for a key as claimed in claim 7, wherein a first layer of paint providing an outline of a character associated with said key is applied to the top of said key cap.

10. The key assembly for a key as claimed in claim 9, wherein a character is etched in said first layer of paint.

11. The key assembly for a key as claimed in claim 10, wherein a second layer of transparent paint is provided between said cap and said first layer of paint.

12. The key assembly for a key of a keypad of an electronic device as claimed in claim 7, wherein said plinth:
   is made of said second material; and
   is formed with said body section when said two-shot moulding process is used.

13. The key assembly for a key of a keypad of an electronic device as claimed in claim 7, wherein said second material in body section comprises a coloured polycarbonate or resin and disperses light from said backlight within said body about said region to further reduce said shadow in said shadow area.

14. The key assembly for a key of a keypad of an electronic device as claimed in claim 7, wherein said key plunger is utilized in a "return" key in said keypad.

15. The key assembly for a key of a keypad of an electronic device as claimed in claim 7, wherein said key plunger is utilized in a "function" key in said keypad.

16. The key assembly for a key of a keypad of an electronic device as claimed in claim 6, wherein an air gap is provided between said key plunger and said key cap when said key cap is mounted over said key plunger.

17. A key assembly for a key of a keypad of an electronic device, comprising:
    a key plunger having:
        a stalk made of first material allowing light to pass through; and
        a body section connected to the top of said stalk, said body section made of a second material and shaped to fit snugly within an interior of a cap for said key and to extend horizontally about said stalk;
    a key cap shaped to fit over said key plunger; and
    a backlight to illuminate an interior of said key cap, said backlight located underneath said key plunger and to a side of said stalk,
wherein
    said second material is translucent and light-diffusing;
    said first material allows more light to pass therethrough than said second material;
    either a two-shot moulding process is used to separately form said stalk and said body section or a welding process is used to bond said stalk to said body; and
    after said key plunger is formed, said second material allows light transmitted from a said backlight which enters said body section from underneath said body section and from said side of said stalk to be dispersed into a region in said body section immediately over said stalk to brighten a first shadow region associated with said region in said body section and said first material allows transmission of light passing through said stalk from said backlight to brighten a second shadow region located on a second side opposite of said side of said stalk.

18. The key assembly for a key as claimed in claim 17, wherein a first layer of paint providing an outline of a character associated with said key is applied to the top of said key cap and said stalk is solid.

19. The key assembly for a key of a keypad of an electronic device as claimed in claim 17, wherein a character associated with said key is etched in a first layer of paint applied to the top of said key cap and said stalk is solid.

20. The key assembly for a key of a keypad of an electronic device as claimed in claim 19, wherein a second layer of transparent paint is provided between said top of said key cap and said first layer of paint.

21. The key assembly for a key of a keypad of an electronic device as claimed in claim 17, wherein an air gap is provided between said key plunger and said key cap when said key cap is mounted over said key plunger.

* * * * *